United States [11] 3,605,043

| | | |
|---|---|---|
| [72] | Inventors | Georges Bienvenu; Pierre Tournois; Jean Louis Vernet, all of Paris, France |
| [21] | Appl. No. | 714,982 |
| [22] | Filed | Mar. 21, 1968 |
| [45] | Patented | Sept. 14, 1971 |
| [73] | Assignee | CSF Compagnie Generale de Telegraphie Sans Fil |
| [32] | Priority | Mar. 29, 1967 |
| [33] | | France |
| [31] | | P.V.100665 |

[54] DISPERSIVE DELAY LINE WITH TUBULAR SECTION
11 Claims, 10 Drawing Figs.

[52] U.S. Cl. ........................................ 333/30, 333/72, 310/8.3, 310/9.4, 310/9.6
[51] Int. Cl. ........................................ H03h 7/30, H03h 9/30, H01v 7/00
[50] Field of Search ........................................ 333/30, 30 M, 71, 72, 18; 310/9.4

[56] References Cited
UNITED STATES PATENTS

| | | | |
|---|---|---|---|
| 2,910,656 | 10/1959 | Portor | 333/30 |
| 3,041,556 | 6/1962 | Meitzler | 333/30 |
| 3,264,583 | 8/1966 | Fitch | 333/30 |
| 3,273,146 | 9/1966 | Hurwitz, Jr. | 333/30 X |
| 2,795,709 | 6/1957 | Camp | 310/9.6 |

FOREIGN PATENTS

| | | | |
|---|---|---|---|
| 758,647 | 10/1956 | Great Britain | 333/30 M |

OTHER REFERENCES

May; J. E., " Wire-Type Dispersive Ultrasonic Delay Lines," Ire. Trans. on Ultrasonics Engineering, June 1960, Vol. UE-7 02, pp. 44– 53., QC 244 A1I2

Meeker; T. R., " Dispersive Ultrasonic Delay Lines Using the First Longitudinal Mode in a Strip," Ire. Trans. on Ultrasonics Engineering, June 1960, Vol. UE-7 02, pp. 53– 58, QC244 A1I2

Sittig; E., " An Acoustic Impedance Transformer Using an Inverted Solid Cone," Ire. Trans. on Ultrasonics Eng., Sept. 1963, Vol. UE-10 02, pp. 104– 106, QC 244 A1I2

Herrmann et al., " Three-Dimensional & Shell-Theory Analysis of Axially Symmetric Motions of Cylinders," J. of Applied Mechanics Vol. 23, 1956, pp. 563– 568, 12-1956

Mirsky et al., " Nonaxially Symmetric Motions of Cylindrical Shells," J. of Acoustical Soc. of America, Vol. 29 010, 10-57, pp. 1116– 1123

Fitch; A. H., " Observation of Elastic-Pulse Propagation in Axially Symmetric & Non-Axially Symmetric Longitudinal Modes of Hollow Cylinders," J. of Acoustical Society of America, Vol. 35 05, 5-63, pp. 706– 708

Zemanek, Jr. et al., " Attenuation & Dispersion of Elastic Waves in Cylindrical Bar," J. of Acoustical Soc. of America, 10-61, Vol. 33 010, pp. 1283– 1288

Franken; P. A., " Input Impedance of Simple Cylindrical Structures," J. of Acoustical Soc. of America, Vol. 32 04, 4-60, pp. 473– 477

Gazis; D. C., " Three-Dimensional Investigation of the Propagation of Waves in Hollow Circular Cylinders Parts I & II," J. of Acoustical Soc. of America, Vol. 31 05, 5-1959, pp. 568– 578

Baron et al., " Tables for Freq. & Modes of Free Vibration of Infinitely Long Thin Cylindrical Shells," J. of Applied Mechanics, 6-1954, pp. 178– 184

Greenspon; J. E., " Vibrations of a Thick-Walled Cylindrical Shell-Comparison of the Exact Theory With Approximate Theories," J. of Acoustical Soc. of America, Vol. 32 05, 5-1960, pp. 571– 578

*Primary Examiner*—Herman Karl Saalbach
*Assistant Examiner*—Wm. H. Punter
*Attorney*—Cushman, Darby & Cushman ABSTRACT: A dispersive delay line with a tubular waveguide wherein are axially propagated waves of sonic or ultrasonic energy corresponding both to shear and compressional modes; suitable transducers are provided at the ends of the waveguide for exciting and collecting said waves.

DISPERSIVE DELAY LINE WITH TUBULAR SECTION

The present invention relates to transmission lines, comprising a pair of electromechanical transducers connected to each other by a waveguide made of an elastic material. It relates more particularly to dispersive lines in which are propagated vibratory waves whose velocity is a function of the vibration frequencies. Dispersive lines are used for linearly compressing frequency modulated pulses and it is necessary for the dispersion of the group delay times within the band of the frequency excursion to be of the same order of magnitude as the duration of the frequency modulated pulses to be compressed. In the case of strip or wire delay lines, this latter condition is difficult to meet if the pulses have a substantial duration and the modulation range is narrow. In fact, this brings about prohibitive line length and losses. In order to overcome this drawback, it is necessary to use a structure and an excitation mode for this guide such that the slope of the usable portion of the dispersion curve is high.

It is an object of this invention to provide such a delay line.

According to the invention there is provided a dispersive delay line for matched filtering of frequency modulated pulsed signals comprising: an elongated elastic tubular waveguide having a longitudinal axis and two end portions; first and second electromechanical transducers respectively coupled to said portions; said first transducer exciting within said tubular waveguide both shear and compressional vibrations having displacements coplanar with said axis and propagating towards said second transducer.

For a better understanding of the invention and to show how the same may be carried into effect reference will be made to the drawing accompanying the following description and in which.

Figure 1:
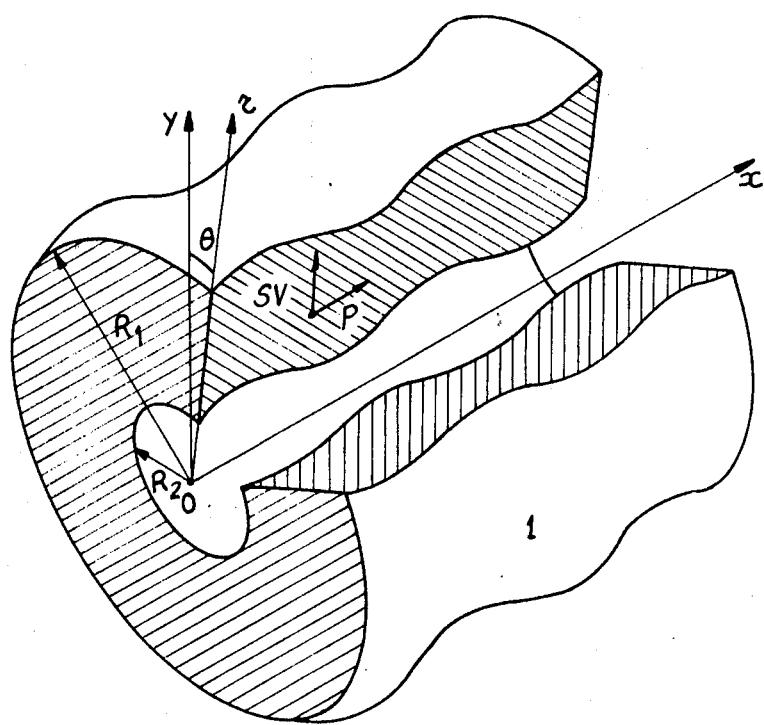
FIG. 1 is a perspective view of a portion of a delay line according to the invention.

FIG. 1 shows a waveguide 1 portion, limited by planes perpendicular to the longitudinal axis $0\ x$. An annular sector defined by two planes passing through $0\ x$ has been cut away. FIG. 1 shows how the waveguide 1 is strained under the action of a wave progressing along $0\ x$; the deformations are of course greatly exaggerated for clarity and in order to show better the nature of the vibratory motion transmitted by the guide 1. Amongst the waves which can be propagated along the guide 1 are of interest only P waves and SV waves, where P indicates the longitudinal compressional wave and SV the vertical shear wave which is polarized in a plane containing the axis of the tube. The resulting wave P+SV propagated by the guide 1 is characterized by a displacement vector $\vec{P+SV}$ contained in a plane such as $r\ 0\ x$, and whose amplitude and phase are functions of $x$ and $r$ only. Discussing only the wave P+SV with symmetry of revolution, it is possible to distinguish two families of modes which can be propagated; the antisymmetrical mode, to which corresponds the radial undulation of the wall shown in FIG. 1 and the symmetrical mode, not shown, to which corresponds an alternating variation in the thickness of the annular wall of the guide. More precisely, if $R_1$ and $R_2$ are the outer and inner radii of the cross section of the undeformed guide, the antisymmetrical mode corresponds to a variation of $R_1$ and $R_2$ in the same sense, while the symmetrical mode corresponds to variations of $R_1$ and $R_2$ in opposite senses.

The wave P+SV defined above is propagated along $0\ x$ with a phase velocity $C$, depending on numerous parameters, amongst which may be mentioned:

$C_S$: free space velocity of shear waves in the elastic medium forming the walls of the guide;

$\sigma$: Poissons modulus of the elastic medium forming the walls of the guide;

$R_1$ and $R_2$: outer and inner radii of the cross section of the guide;

$m=(R_1-R_2)/R_2$: form factor;

$f$: frequency of the vibratory movement of the wave P+SV.

Assuming for the sake of simplicity that the media surrounding and filling the guide have negligible stiffness and specific mass as compared to the elastic medium forming the same, the inner and outer surfaces are free, which makes it possible to find out mathematical relations between the geometrical parameters and the physical parameters given above. The establishment of these relations follows from the following description, but it is possible to give a graphical representation which is much more striking.

Figure 2:
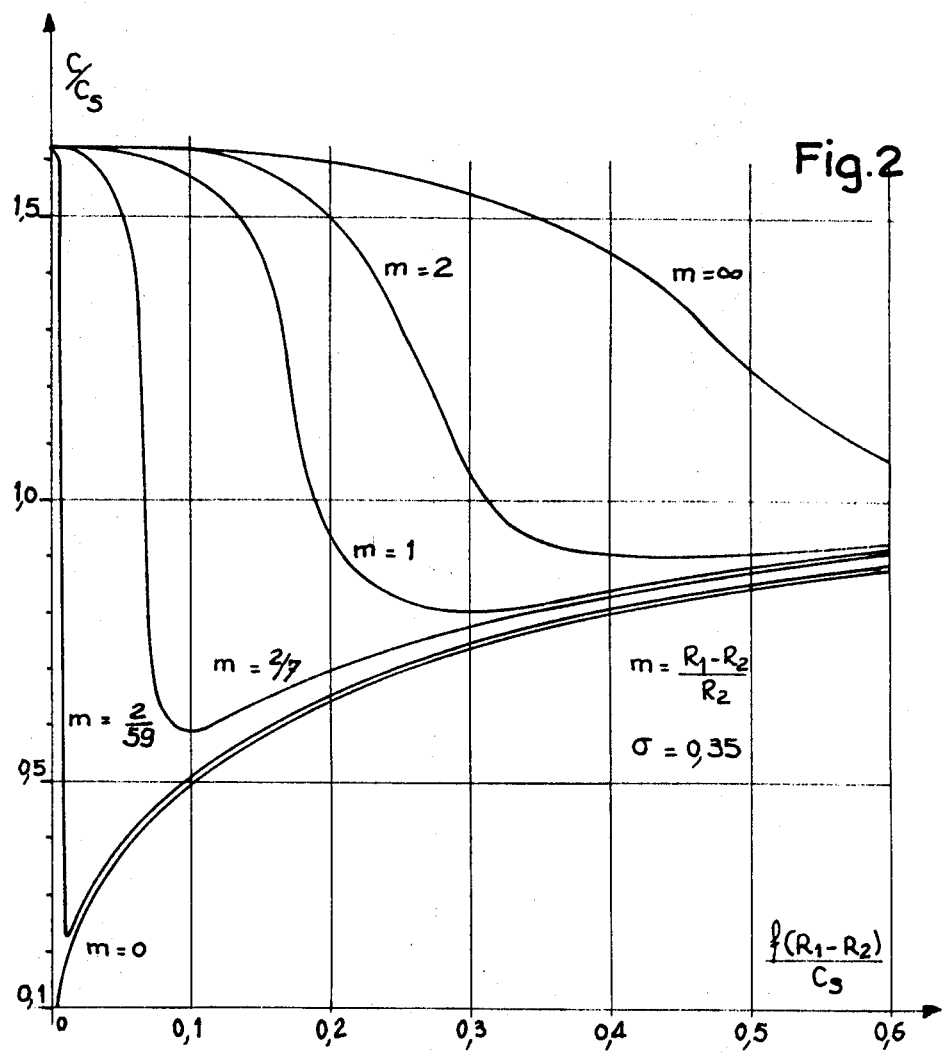
FIG. 2 is an explanatory diagram.

FIG. 2 shows curves which are established either by experiment or by numerical calculation. The parameter $f(R_1-R_2)/C_S$ is plotted along the abscissa, the ratio $C/C_S$ is plotted along the ordinate. The family of curves shown corresponds to the relations connecting the phase velocity $C$ with the frequency $f$ of the wave propagated longitudinally for several values of the parameter $m$. The curves of FIG. 2 relate to the case of the first antisymmetrical mode of the wave P+SV, as shown in FIG. 1, and to a tubular copper waveguide.

FIG. 2 shows that between the extreme situations, respectively corresponding to a cylindrical guide without any hollow core ($m=\infty$) and to a tubular guide with an infinitely thin wall ($m=0$), the curves showing variation of $C$ as a function of the frequency display a slope which is growing steeper as the frequency range increases. This shows that the tubular delay lines have a distinct advantage over wire or strip lines in so far as compression of pulses with an appreciable duration and a reduced frequency modulation range is concerned.

Figure 3:
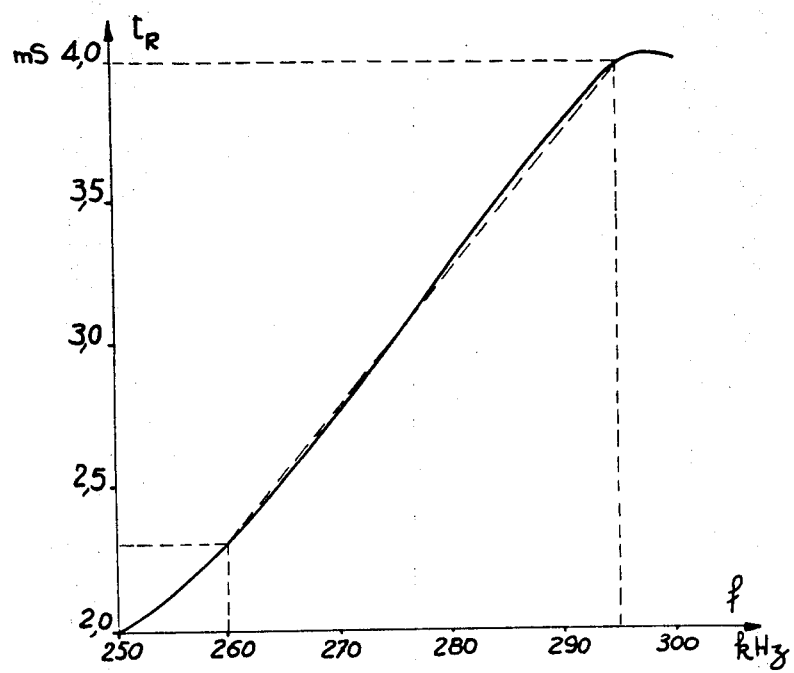
FIG. 3 shows a dispersion curve.

FIG. 3 shows a dispersion curve which is derived from the curve $m=2$ in FIG. 2. The frequency $f$ of the wave propagated is plotted along the abscissae and the group delay time $t_R$ in milliseconds is plotted along the ordinates. The solid line curve corresponds to a tubular copper guide with a length $l_0=4.075$ meters, an inner radium $R_2=1$ mm. and an outer radius $R_1=3$ mm. The group delay time $t_R$ is linked with the phase velocity $C$ by the following relations:

$$v_\varepsilon = \frac{C}{1-\frac{f}{C}\frac{dC}{df}} \qquad t_R = \frac{l_0}{v_\varepsilon}$$

The dotted line curve in FIG. 3 shows between which limits the solid line curve has a straight section. Such a guide is therefore suitable for compressing a linearly frequency modulated pulse in a band $\Delta f=35$ Kc./s. and whose duration prior to compression is of the order of 1.7 milliseconds. After compression, the pulse has a duration equal to the reverse of the band width $\Delta f$, i.e., 0.0286 milliseconds.

Figure 4:
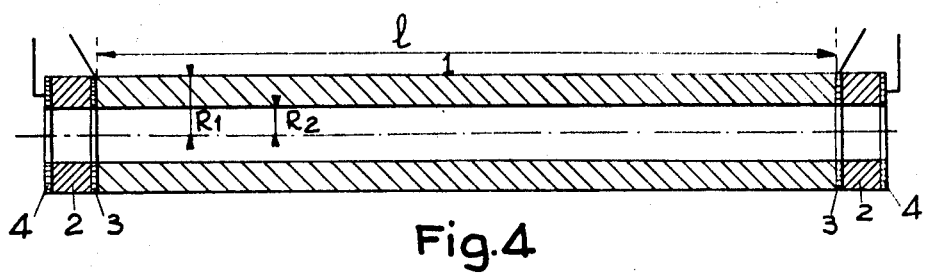
FIG. 4 is a first embodiment of a dispersive line according to the invention.

FIG. 4 shows a tubular waveguide dispersive line according to the invention. It comprises a tubular elastic guide 1 with a length $l$, an inner radius $R_2$ and an outer radius $R_1$; the end faces of the guide 1 are connected to electromechanical transducers 2 which may be piezoelectric or electrostrictive. These transducers have annular shape and are equipped with flat electrodes 3 and 4. Under the effects of an electric voltage applied to the electrodes 3 and 4, they vibrate according to a thickness mode or radial mode, and create in the guide 1 a vibrating wave (P+SV). The resulting deformations are shown in FIG. 1. The transducers 2 being reversible and the guide 1 being dispersive, an electric signal may be applied to a pair of electrodes 3, 4 and collected from another pair of electrodes 3, 4 in the form of an electric signal whose constituents are dispersed in time as a function of their frequencies.

Figure 5:
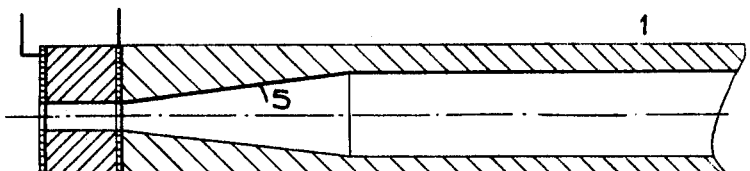
FIGS. 5, 6, 7 and 8 are partial views of different modifications of the dispersion line according to the invention.

FIG. 5 shows another embodiment of the dispersive line according to the invention. The waveguide 1 is extended at each end by an annular member 5 with increasing wall thickness in order to match the mechanical impedance of the transducer to the characteristic impedance of the part of the waveguide with constant cross section.

Figure 6:
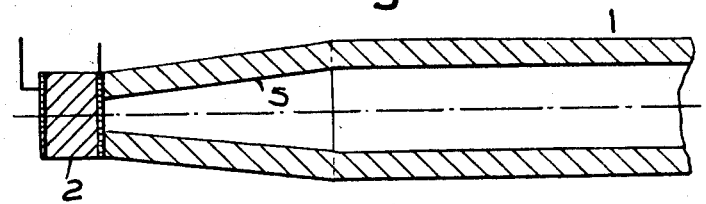

FIG. 6 shows a second embodiment of the dispersive line according to the invention, wherein the waveguide 1 is extended at each end by an annular portion 5 of conical shape so as to match the transducer 2 to the waveguide 1.

Figure 7:
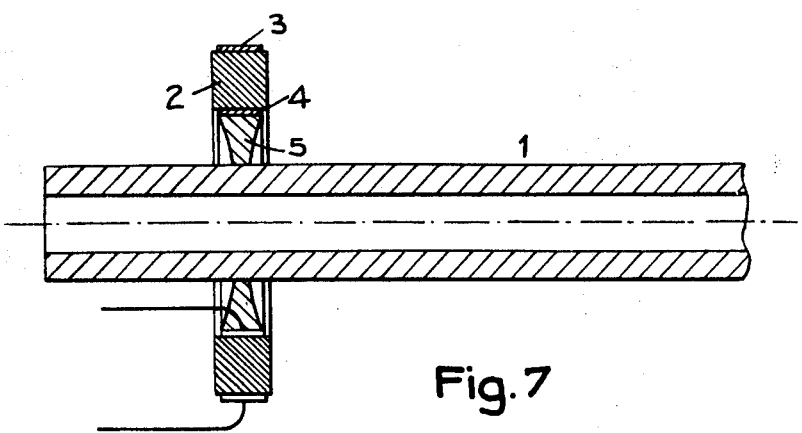

FIG. 7 shows a third embodiment of the dispersive line according to the invention; the tubular guide is excited in the vicinity of its ends by an annular transducer 2 through a matching device 5 whose shape is annular and which has a cross section which is flared in the direction away from the axis of the guide 1. This transducer is used according to the radial mode or thickness mode and its electrodes 3 and 4 are arranged concentrically.

Figure 8:
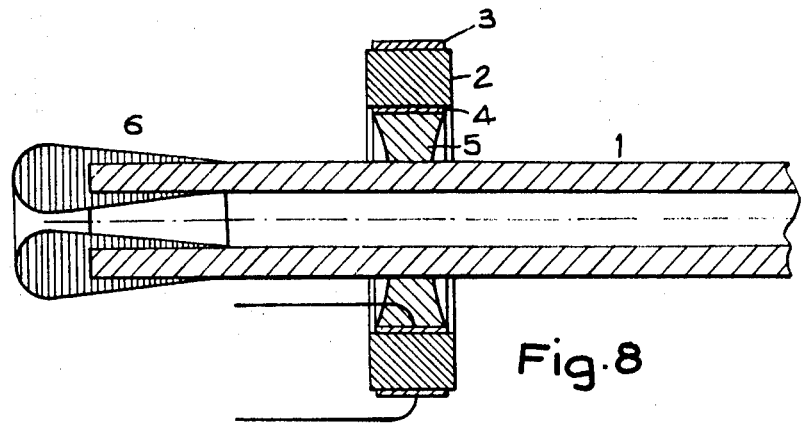

FIG. 8 shows a fourth embodiment of the dispersive line according to the invention. It comprises, additionally to the elements of FIG. 7, a terminal absorbing load 6 formed by a coating of a dissipative or damping material formed at the end of the guide.

Figure 9:
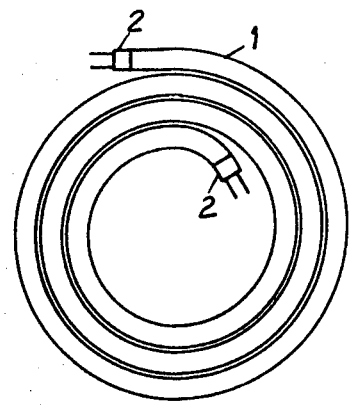
FIGS. 9 and 10 show two other embodiments of the dispersive line according to the invention.
Figure 10:
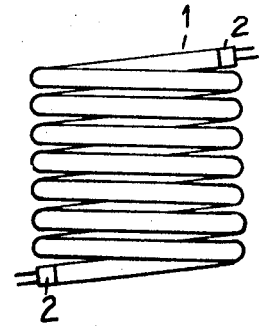

FIGS. 9 and 10 show how the dimension of the lines according to the invention can be reduced, by coiling them, respectively, as a spiral and as a helix. In this case, the longitudinal axis of the waveguide is curvilinear instead of being rectilinear as above. The dispersive properties remain unchanged provided that the mean diameter of the winding is large compared with the outer diameter of the guide 1. It is important that successive turns should not make contact and that they should be supported by supports which do not alter the characteristic impedance of the guide within the transmitted frequency band.

The dispersive lines with tubular guides are of particular interest, where a very high ratio $\Delta t_R/\Delta f$ is required; by way of example, a tube wound in a helix on a cylinder with a 50 cm. diameter and a 10 cm. length makes it possible to compress a linearly modulated pulse of 50 milliseconds in a frequency range of 5 Kc./s.; the compressed pulse has a duration reduced by a factor of 250. It can be easily seen in FIG. 2 that for achieving a very high ratio $\Delta t_R/\Delta f$ the thickness of the waveguide should be selected smaller than $C_S/3f$, where $f$ is the upper frequency of the frequency range $\Delta f$.

Of course, the invention is not limited to the embodiments described and shown which were given solely by way of example.

We claim:

1. A dispersive delay line for matched filtering of frequency modulated pulsed signals comprising: an elongated elastic tubular waveguide having a longitudinal axis and two end portions, first and second electromechanical transducers respectively coupled to said portions; said first transducer exciting within said tubular waveguide both shear and compressional vibrations having displacements coplanar with said axis and propagating towards said second transducer; the wall of said waveguide having between said end portions a thickness smaller than the ratio of the bulk shear velocity of the material of said waveguide to three times the upper frequency of the frequency range of said vibrations.

2. A dispersive delay line as claimed in claim 1, wherein said transducers comprise a cylinder of electrostrictive material; said cylinder having two opposite faces respectively carrying a free electrode and another electrode coupled to said end portions.

3. A dispersive delay line as claimed in claim 1 further comprising mechanical impedance matching devices inserted between said transducers and said end portions.

4. A dispersive delay line according to claim 1, wherein said transducers are mounted in prolongation of said end portions.

5. A dispersive delay line as claimed in claim 1, wherein said axis is rectilinear.

6. A dispersive delay line as claimed in claim 1, wherein said axis is curvilinear.

7. A dispersive delay line according to claim 1, wherein said transducers surround said end portions.

8. A dispersive delay line as claimed in claim 7 further comprising absorbing means carried by said end portions.

9. A dispersive delay line as claimed in claim 1, wherein said waveguide has a constant annular section between said end portions.

10. A dispersive delay line as claimed in claim 9, wherein said end portions have the same inner and outer radii as said waveguide.

11. A dispersive delay line as claimed in claim 10, wherein at least one of said radii is gradually decreasing towards said transducers thus building up tapered end portions.